Patented Aug. 9, 1927.

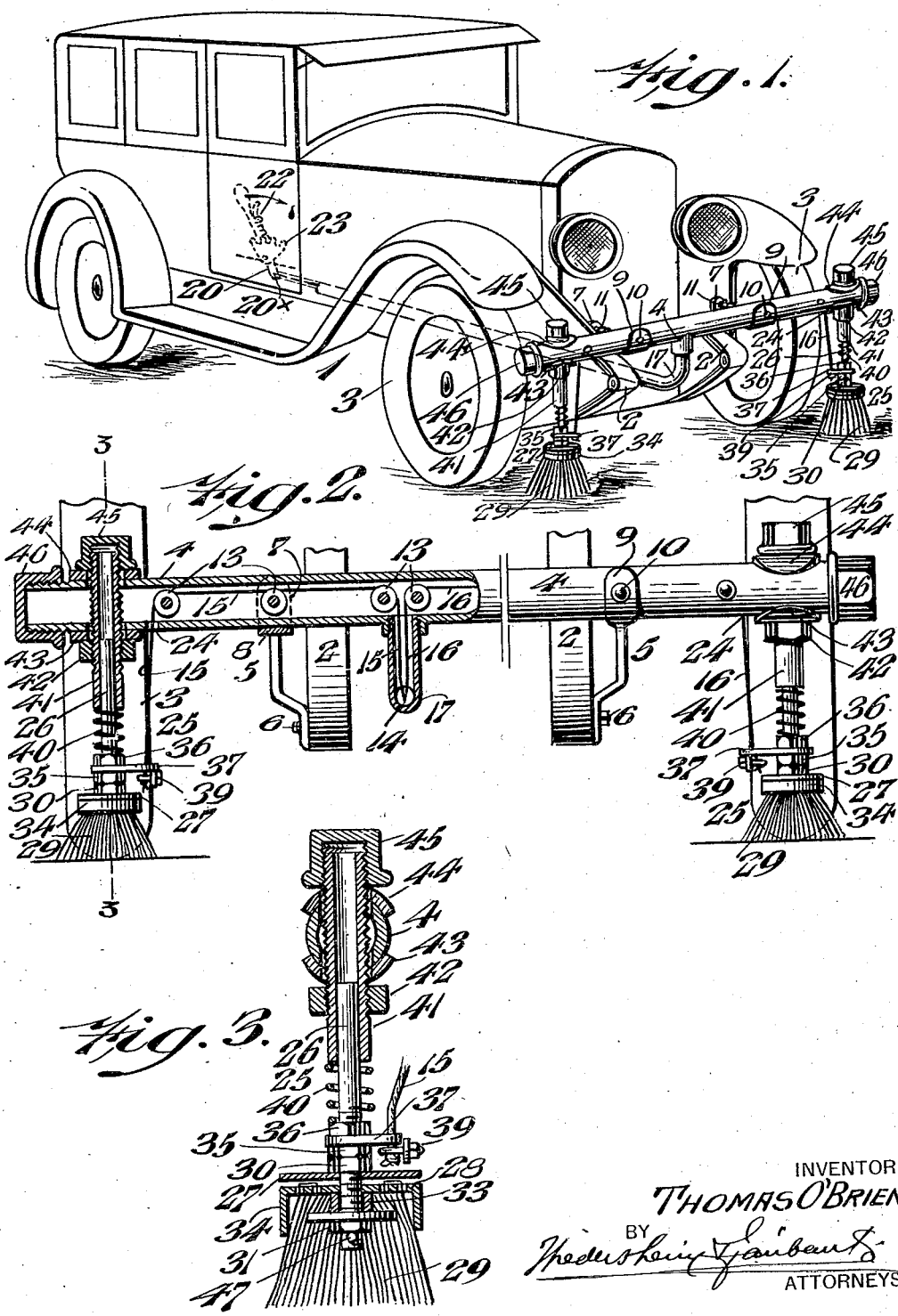

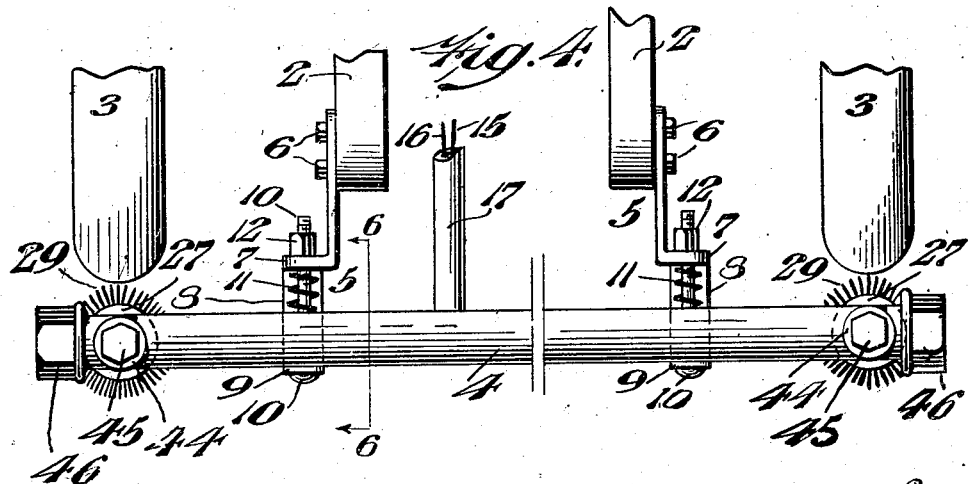

1,638,641

UNITED STATES PATENT OFFICE.

THOMAS O'BRIEN, OF PHILADELPHIA, PENNSYLVANIA.

COMBINED BUMPER AND BRUSH ATTACHMENT FOR VEHICLES.

Application filed November 9, 1926. Serial No. 147,224.

My invention relates to a new and useful combined bumper and brush attachment for vehicles as self propelled vehicles, and it relates more particularly to a novel, simplified construction of a brush attachment and a hollow bumper which will afford maximum protection in case of collision or impact, will not add materially to the dead weight of the vehicle and will be relatively inexpensive to manufacture.

My invention further relates to a novel hollow bumper construction of universal applicability, which may be equally well applied to vehicles under construction as well as to vehicles already manufactured and in use, both separately and in conjunction with my novel brush attachment.

My invention still further relates to a novel brush attachment adapted to be installed within and carried by my novel bumper, whereby a brush is adjustably held in operative position in front of each front wheel of a vehicle, thereby to clear the road of any débris that may injure the pneumatic tires, such as tacks, nails, broken glass or which may endanger or retard the safe progress of a vehicle, such as snow, slush, mud and the like.

Another feature of my invention resides in actuating or operating the brush attachment of my novel construction, from a point in proximity to and within easy reach of the driver of the vehicle without in any way interfering with the mechanism thereof, or occupying any space within the same, and whereby the brushes may be thrown into or withdrawn from the operative position at will, and without the necessity of stopping the vehicle, or in any way interfering with the progress thereof.

My invention also contemplates the provision of novel means for regulating and adjusting the height of the brushes with respect to the surface of the road, thus not only rendering the same adjustable as the varying character of the road may require, but also rendering it possible completely to use up the brush, that is, until the bristles thereof are completely worn out, thus effecting considerable economy in the use and consumption of the brushes.

Another object of my invention is to provide a novel mechanism, whereby the brushes may be thrown into or withdrawn from the operative position instantaneously, thus enabling the driver of the vehicle to use the brushes for relatively short periods or intervals, when and as required, thereby eliminating all unnecessary wear or use of said brushes. Other objects and features of my invention will be more apparent from the following description taken in connection with the accompanying drawings.

With the above ends in view, my invention consists of a novel hollow bumper construction, suitably secured to the front portion of the vehicle or its chassis, a pair of brushes carried by the respective ends of said bumper in alignment with the two front wheels of said vehicle, means yieldably to maintain said brushes in the operative or lower position with respect to the road, actuating means to raise or withdraw the brushes from the lower operative position, means to protect the bristles of said brushes, means to space apart said bristles and maintain the same in the spread condition, means to adjust the height of said brushes with respect to the surface of the road, means to adjust and predetermine the upward and downward movement of said brushes as the same are raised or withdrawn from the lower operative position into the upper inoperative position, and devices for locking said actuating means in any desired position.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings,

Figure 1 represents a perspective view of an automobile equipped with a novel combined bumper and brush attachment, embodying my invention.

Figure 2 represents a view partly in section and partly in elevation of the combined bumper and brush attachment secured to the front portion of a chassis.

Figure 3 represents a vertical sectional view on line 3—3 of Figure 2.

Figure 4 represents a top plan view of Figure 2.

Figure 5 represents, partly in section, and partly in elevation my novel construction of bumper and brush attachment and the mechanism for actuating the same.

Figure 6 represents a sectional view on line 6—6 of Figure 4.

Figure 7 represents a view on line 7—7, Figure 5.

Referring to the drawings in which like reference characters indicate like parts, 1 designates the chassis of a vehicle equipped with the combined bumper and brush attachment embodying my invention. 2 designates the springs and 3 the wheels. To each of the springs 2 is secured the rear or inner end of the bracket 5 by means of the bolts or other fastening means 6. The brackets 5 comprise the rear vertical arm 7 and the horizontal arm 8, the latter being curved upwardly and inwardly and terminating in the front vertical portion 9. Resting on said horizontal arm 8 and secured to the vertical arm by the bolt 10 is the hollow bumper 4 between which and the inner vertical arm 7 is interposed the spring 11, also carried by the bolt 10, said spring imparting resiliency to the bumper 4 as will be understood from Figure 6. The bolt 10, passing through the arm 9 and the bumper 4 carrying the spring 11 extends through the arm 7 and is held in place by the threaded nut 12, which also serves to regulate the tension of the spring 11.

Within the hollow tubular bumper 4 are positioned the pulleys 13 over which pass the cords or similar flexible connections 15 and 16 which extend inwardly through the centrally disposed bent pipe 17 and merge into the single cord 14, detachably connected to the outer end of the horizontal rod 18, the inner end of which threadedly engages the outer end of the rod 19. The inner end of the latter is pivoted as at 20$^x$ to the lower end of the lever 20 fulcrumed at the point 21 and retained in any desired position by the spring pressed pawl 22 cooperating with the ratchet 23 as will be understood from Figure 5. The lever 20, the pawl 22 and ratchet 23 are located at a suitable point on the chassis in proximity to and within easy reach of the driver of the vehicle, as will be understood from Figure 1.

The cords 15 and 16 emerge from the tubular bumper 4 at the points 24 and carry at their extremities the brushes and their adjuncts 25 mounted on the rod 26 and comprising the upper and lower discs or plates 27 and 28 between which are tightly clamped the bristles 29 by means of the nuts 30 and 31 respectively engaging the lower end of said rod 26. The washer 32 is spaced from the plate 28 by the spacing member 33, said washer 32 serving to separate and shred the bristles of said brush while the pendant vertical flange or wall 34 of said plate 28 serves to gather and reinforce the bristles 29 to protect the same against bending, breaking or twisting. The transverse cotter pin or the like 47 serves to prevent the nut 31 from working loose, as will be understood from Fig. 3. Between the nuts 35 and 36 is secured the oval or other shaped plate 37 provided with the aperture 38 in which is secured the outermost end of the cord 15 or 16 respectively, by means of the clamp 39, the nuts 35 and 36 also serving to regulate the tension of the spring 40, the lower end of which bears against said nut 36 while the upper end thereof bears against the lower end of the sleeve 41 extending through and secured to the bumper 4 by means of the nuts and washers 42, 43, 44 and 45 respectively, as will be understood from Figures 2 and 3. The rod 26 carrying the brush 25 is adapted to slide upwardly or telescope into said sleeve 41 against the tension of the spring 40 when it is desired to elevate the brush 25 and its adjuncts from engagement with the rod, in the manner hereinafter described. 46 designates a threaded cap or closure engaging the respective ends of said bumper 4 and closing the same against the ingress of dust and other foreign matters.

The operation is as follows:—

When the lever 20 is in the backward position shown in dotted lines, Figure 1, the rods 19 and 18 are in their forward or outermost position and the spring 40 forces the brushes 25 downwardly into the operative position, also shown in Figures 1, 2, and 5. When it is desired to elevate or withdraw the brushes 25 from engagement with the road, the lever 20 is moved forward in the direction of the arrow, thus drawing the rods 19 and 18 and therefore the cord 14 and its branches 15 and 16 backwardly, thereby raising or withdrawing the brushes 18 from engagement with the road against the force of the spring 40. In this inoperative or upper position, the rod 26 carrying the brush 25 slides upwardly or telescopes into the sleeve 41, as will be understood from Figures 2 and 3.

The threaded portions of the rods 19 and 18 are of substantially the same length as the bristles 29 of the brush 25, so that as the latter get shorter by use and wear the rod 19 is gradually unthreaded from the rod 18, thus increasing the length of the cords 15 and 16 and thereby compensating for the decrease of the length of the bristles, and permitting the use of the brush until the bristles thereof are completely worn out when a new brush is employed and the externally threaded portion of the rod 19 is again completely threaded into the internally threaded portion of the rod 18.

The sleeve 41 also acts as a guide and support for the brush 25 carried by the rod 26, slidably mounted in said sleeve and engaged thereby at all times.

The bumper 4 of my novel construction is further calculated to afford a maximum amount of protection, since, in addition to its inherent resiliency, it bears against the spring 11 and is secured to and carried by the resilient arms 9 and 7 of the bracket 5, which in turn is secured to the resilient spring members 2 on the chassis of the vehicle. My novel tubular bumper 4 in addition to being light in weight and simple in construction, also serves as a housing for the cords 15 and 16, of the brushes 25, thus producing an efficient, compact and neat arrangement, as is evident.

Having thus described my invention what I claim as new and desire to secure by Letters Patent, is:—

1. In a device of the character stated, a front, tubular bumper adapted for installation transversely upon a vehicle, vertical sleeves secured to the outer ends of said bumper, rods carrying brushes at their lower ends and telescoping into said sleeves, pulleys in said bumper, cables extending over said pulleys and through said tubular bumper and having their outer ends connected to said rods and brushes, and means connected to the inner ends of said cables for actuating said cables, rods and brushes to raise and lower the latter.

2. In a device of the character stated, a chassis, a downwardly and horizontally extending tubular member longitudinally disposed with respect thereto and connected therewith, a front tubular bumper connected with said tubular member and adapted for installation transversely upon a vehicle, cylindrical sleeves secured to the outer ends of said bumper, rods carrying adjustable brushes at their lower ends and telescoping into said sleeves, springs carried by said rods and adapted normally to maintain said brushes in their lowermost position with respect to said sleeves, cables extending through said tubular member and through said bumper having their outer ends connected to said rods and brushes, and means connected to the inner ends of said cables for actuating said cables, rods and brushes, to raise the latter against the force of said spring.

3. In a device of the character stated, a chassis, a front transverse tubular bumper carried thereby, a downwardly and horizontally extending tubular member connected with said bumper and said chassis and longitudinally disposed with respect to the latter, sleeves secured to the outer ends of said bumper, rods carrying adjustable brushes at their lower ends and vertically slidable in said sleeves, spring members carried by said rods and adapted to maintain said brushes in their lowermost position with respect to said sleeves, cables extending through said tubular member and through said bumper and having their outer ends connected to said rods and brushes, actuating means connected to the inner ends of said cables for raising and lowering said rods and brushes, and means to adjust the connection of said cables to said actuating means.

4. In a device of the character stated, a chassis, a front tubular bumper transversely carried thereby, a downwardly and horizontally extending tubular member connected with said bumper and said chassis and longitudinally disposed with respect to the latter, vertical sleeves secured to the respective ends of said bumper, rods detachably carrying brushes at their lower ends and vertically slidable in said sleeves, a spring carried by each of said rods intermediate said brushes and the lower ends of said sleeves normally to maintain said brushes in their lowermost position with respect thereto, cables extending through said tubular member and said bumper and having their outer ends connected to said rods and brushes, actuating means connected to the inner ends of said cables to raise and lower said brushes, and devices to lock said actuating means in any desired position.

5. In a device of the character stated, a chassis, a front tubular bumper transversely carried thereby, and having a series of pulleys positioned therein, a downwardly and horizontally extending tubular member connected to said bumper and said chassis and longitudinally disposed with respect to the latter, vertical sleeves permanently secured to the respective ends of said bumper, rods carrying brushes at their lower ends and telescoping in said sleeves, cables extending through said tubular member and said bumper and passing over said pulleys, the outer ends of said cables being connected to said rods and brushes, and means connected to the inner ends of said cables for actuating said cables, rods and brushes to raise and lower the latter.

6. The combination with an automobile chassis, of a tubular horizontal bumper yieldably carried by the front end thereof, a series of pulleys in said bumper, a brush yieldably and adjustably carried at each end of said bumper, actuating means carried by said chassis in proximity to the seat of the driver of said vehicle, means to lock said actuating means in any desired position, and adjustable means extending longitudinally of said chassis and terminating in cables passing over said pulleys and through said bumper to connect said actuating means to said brushes, thereby to raise and lower the latter at will.

7. The combination with an automobile chassis, of a tubular horizontal bumper yieldably carried by the front end thereof, a series of pulleys in said bumper, a brush yieldably and adjustably carried at each end of said bumper, actuating means carried by said chassis in proximity to the seat of the driver of said vehicle, means to lock said actuating means in any desired position and adjustable means extending longitudinally of said chassis and terminating in a cable passing over said pulleys and through said bumper to connect said actuating means to said brushes to raise and lower the same at will, each of said brushes comprising a rod, upper and lower plates carried by the lower threaded end of said rod, bristles clamped between said plates, an annular pendant flange extending from the lower of said plates, to protect said bristles against bending and breaking, a spacing member adjustably carried by the lower end of said rod and suitably spaced from the lower of said plates to maintain said bristles in the spread condition, and means to maintain said spacing member in position at all times.

THOMAS O'BRIEN.